Feb. 9, 1960     R. M. GURRIES     2,924,015
ACCUMULATOR RULE
Filed Aug. 16, 1957

INVENTOR
RICHARD M. GURRIES.

BY *Robert L. Gunn*
ATTORNEY.

United States Patent Office 2,924,015
Patented Feb. 9, 1960

2,924,015

ACCUMULATOR RULE

Richard M. Gurries, San Jose, Calif.

Application August 16, 1957, Serial No. 678,891

3 Claims. (Cl. 33—107)

This invention relates to mechanical calculators and deals with what may be termed an accumulator rule.

The device to be hereinafter shown and described has been developed to meet a demand for measuring the overall length of pipe lines, trenches, boundaries, or the like as shown on scale drawings.

In construction engineering work, it is common practice to find the required overall length of pipe or the like, for any job by measuring the runs of pipe from a scale drawing. Usually the work is laid out in straight runs between bends or corners and the estimating engineer is required to measure each run individually and add them to get a total representing the footage required. The same is true of trenches, boundaries, etc. My invention provides a device whereby consecutive lengths of work, such as described, shown on a scale drawing may be measured, accumulated and added in one operation.

Briefly stated, my invention amounts to a straight edge, or ruler, having calibrations along the edge of the same scale as shown on the drawing to be scaled, said rule having a slider on the edge thereof with a pointer extending outwardly therefrom near the surface of the drawing adapted to be engaged by a pencil and be moved thereby as the pencil traces the work to be measured. The slide is especially designed to be moved by pencil pressure and yet maintain a fixed position on the rule under all normal conditions of rest.

In the preferred form of my invention, I form a specially shaped slot in each edge of a ruler and insert my slider therein. One of the objects of this invention is to provide a slider arrangement whereby the slider may be inserted into a slot in the edge of a ruler without removing any part of the slider or ruler.

Another object of my invention is to provide an especially shaped ruler peculiarly adaptable for my purpose of inserting sliders on each edge thereof.

Other objects and advantages will become apparent as the description proceeds in conjunction with the drawing in which.

Figure 1:
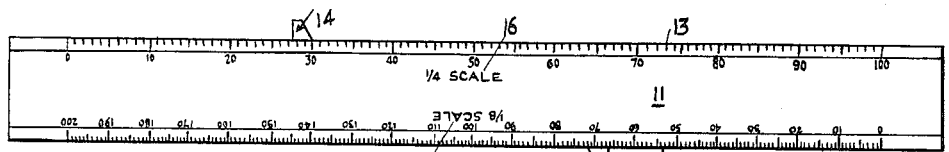
Fig. 1 shows a ruler equipped with my invention.

Referring to the drawing, it can be seen that Fig. 1 illustrates a ruler 11 having calibrations 12 and 13 on opposite edges thereof with a slider 14 on each edge arranged to work in conjunction with the calibrations. It will also be noted that while each edge of the ruler is calibrated and the scale of the calibrations marked on the face of the ruler, such as ⅛ and ¼ shown at 15 and 16 respectively, the scale of the calibrations does not correspond to the foot and inch scale usually shown in such a set up. Since this ruler has been developed to measure and accumulate footage shown in feet and inches on scale drawings and show the total of such footage in the decimal system, the ruler is laid out in feet and inches and is calibrated in the decimal system. This permits the user to select the rule that corresponds to the scale of the drawing under inspection, and to quickly and accurately measure and show the total of any pipe lines, trenches, boundaries or the like that are shown on the drawing.

Figures 2, 5:
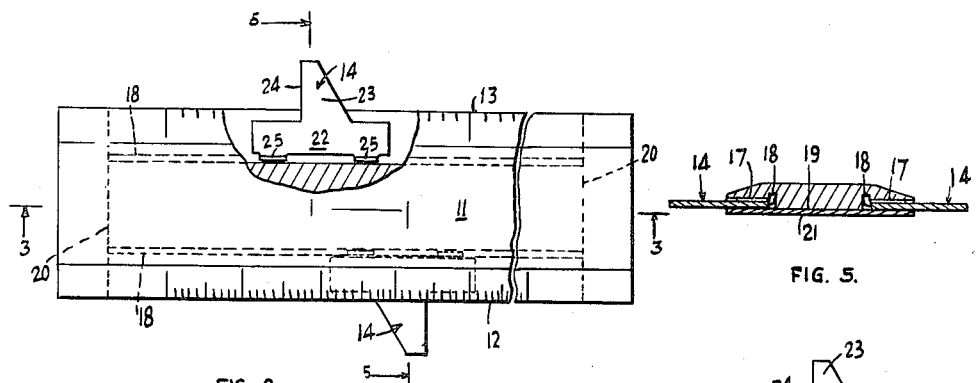
Fig. 2 is an enlarged view of my ruler, partly broken away and foreshortened to show how the slider is mounted in the ruler.
Fig. 5 is a cross section of the ruler taken on line 5—5 of Fig. 2.

Part of the novelty of my invention resides in the construction of the ruler itself. In the preferred form the ruler has the conventional top surface with the sloping elges, best seen in Fig. 5. Since both edges are the same in construction, a description of one will serve for both. The under side of the ruler is cut away as shown in Fig. 5. Here it can be seen that the under side of the ruler is cut back to faces 17 that terminates at the inner ends in slots 18, leaving a face 19 between the slots running full length of the slots. It will also be noted that the slots 18 end at shoulders 20 at end of the ruler which is formed by terminating the cuts on the under side of the ruler at these points. On the face 19 I mount a thin member 21 of suitable material that extends to the edges 12 and 13. The member 21 may be attached in any manner as by adhesion or by mechanical means, such as screws. It will be observed that the slots 18 extend beyond the ends of the calibrations to permit the slider to come to the zero calibration for a starting point.

Figure 6:
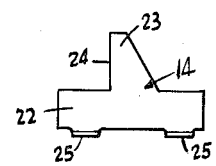
Fig. 6 is a plan view of the slider.
Figure 3:
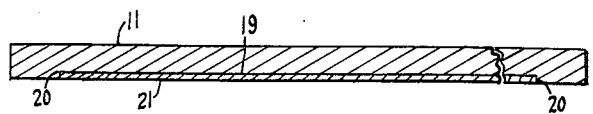
Fig. 3 is a longitudinal section on line 3—3 of Fig. 2.
Figure 7:
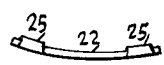
Fig. 7 is a side view of the slider.

My invention also includes a novel slider that may be inserted into the slot along the edges of the ruler without removing any part of the ruler or slider. For this purpose, the slider is formed as shown in Figs. 6 and 7. The material of the slider should be resilient and comparatively thin and may be either metal, plastic, or any other suitable material insofar as the invention is concerned. In these views the slider generally designated 14, is shown as consisting of a flat elongated, slightly curved body portion 22 having a pointer 23 extending outwardly therefrom, said pointer having a straight edge 24, On the inner side of the slider I provide two upturned toes 25 that extend slightly above the face of the flat portion 22 which in conjunction with the curved body furnish a means of slidably mounting the slider on the rule.

Figure 4:
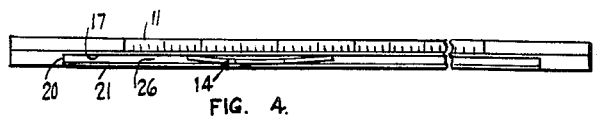
Fig. 4 is a side view of a portion of the ruler showing how the slider fits into the side of the ruler.

By referring to Fig. 4 it will be seen that between the face 17 formed on the under side of the ruler and the thin member 21 mounted on the bottom side of the ruler there is a slot 26 extending along the edge of the ruler. On the inner end of this slot there is the groove 18 paralleling the edge of the ruler. The slot 26 is made slightly thicker than the body of the slider 14 and the slider is mounted in the slot by straightening the body of the slider and pressing it in the slot until the toes 25 snap up into the groove 18. When in this position the slider is locked in the slot against removal but is free to slide longitudinally in the slot. The curvature of the slider will supply enough friction to hold it against inadverent movement.

In use, a ruler is selected to correspond to the scale shown on the drawing, that is, if the drawing is made in one quarter inch equals one foot, a ¼ scale ruler is used. The ruler is laid along the pipe line, or whatever is to be measured, and the slider is brought to the zero reading on the calibrations with the straight edge 24 lined up with the calibration. A pencil is spotted on the starting point of the job to be measured and the pointer on the ruler is brought against the pencil point. Any movement of the pencil will move the pointer correspondingly which usually runs to a bend or turn in the pipe line. The pencil may be colored and used to trace a line over the work to be measured to indicate the extent to which the drawing has been measured. The rule will show the accumulated footage which may either be recorded at that point or left on the rule for a continuation from the point of stoppage indicated by the colored line on the drawing. In this manner work may be interrupted without necessitating repetition of measurement or personal hazard of remembering footage total. The operation may be continued until the entire length of calibration is exhausted, at which time the total shown on the rule is recorded, or it may be stopped anywhere and the total at that point may be read and/or recorded. In tracing the line of pipe on the drawing it is recommended that a colored pencil be used to avoid retracing lines already measured. Also there may be occasions where a long ruler may be advantageously employed. With a little practice an operator may become very proficient and the ruler will not only prove to be a time saver but a more accurate way of figuring pipe layouts, or the like.

I claim:

1. An accumulator rule comprising a comparatively thin elongated body having an inwardly extending slot on the edge thereof, a groove at the inner end of said slot forming a shoulder on the lateral wall of said slot running substantially parallel to the edge of said rule, a slider adapted to be detachably and slidably mounted in said slot, said slider being composed of resilient material and having a curved body with a pointer thereon adapted to extend beyond the edge of said body, there being spaced upstanding toes on the inner edge of said slider adapted to pass through said slot and engage said groove when said slider is inserted into said slot.

2. An accumulator rule comprising a comparatively thin elongated body having a slot on each side thereof extending inwardly from each edge with an offset groove in the inner end of each slot forming a shoulder running substantially parallel to said edges, sliders with pointers thereon adapted to be slidably and detachably mounted in said slots, said sliders having resilient bodies curved in cross section taken along the slots with spaced upstanding toes on the inner edges thereof, said toes being of sufficient height to pass through said slots and snap into said grooves when said slider bodies are pressed home in said slots.

3. For use in an accumulator rule having an inwardly extending slot along the edge thereof with an offset groove at the inner end of said slot running substantially parallel with said edge, a slider comprising a body of resilient material having a pointer thereon and spaced upstanding toes opposite said pointer, said body being curved in cross section taken along the slot in said rule and said toes being on the concave side of said body of predetermined height to pass through said slot and engage said groove when said slider is pressed home in said slot.

References Cited in the file of this patent
UNITED STATES PATENTS

| | | |
|---|---|---|
| 139,601 | Nagle | June 3, 1873 |
| 781,465 | Sharkey et al. | Jan. 31, 1905 |
| 2,141,990 | Kahn | Dec. 27, 1938 |
| 2,486,748 | Koenig | Nov. 1, 1949 |
| 2,562,335 | Rundquist | July 31, 1951 |